United States Patent Office
3,718,387
Patented Feb. 27, 1973

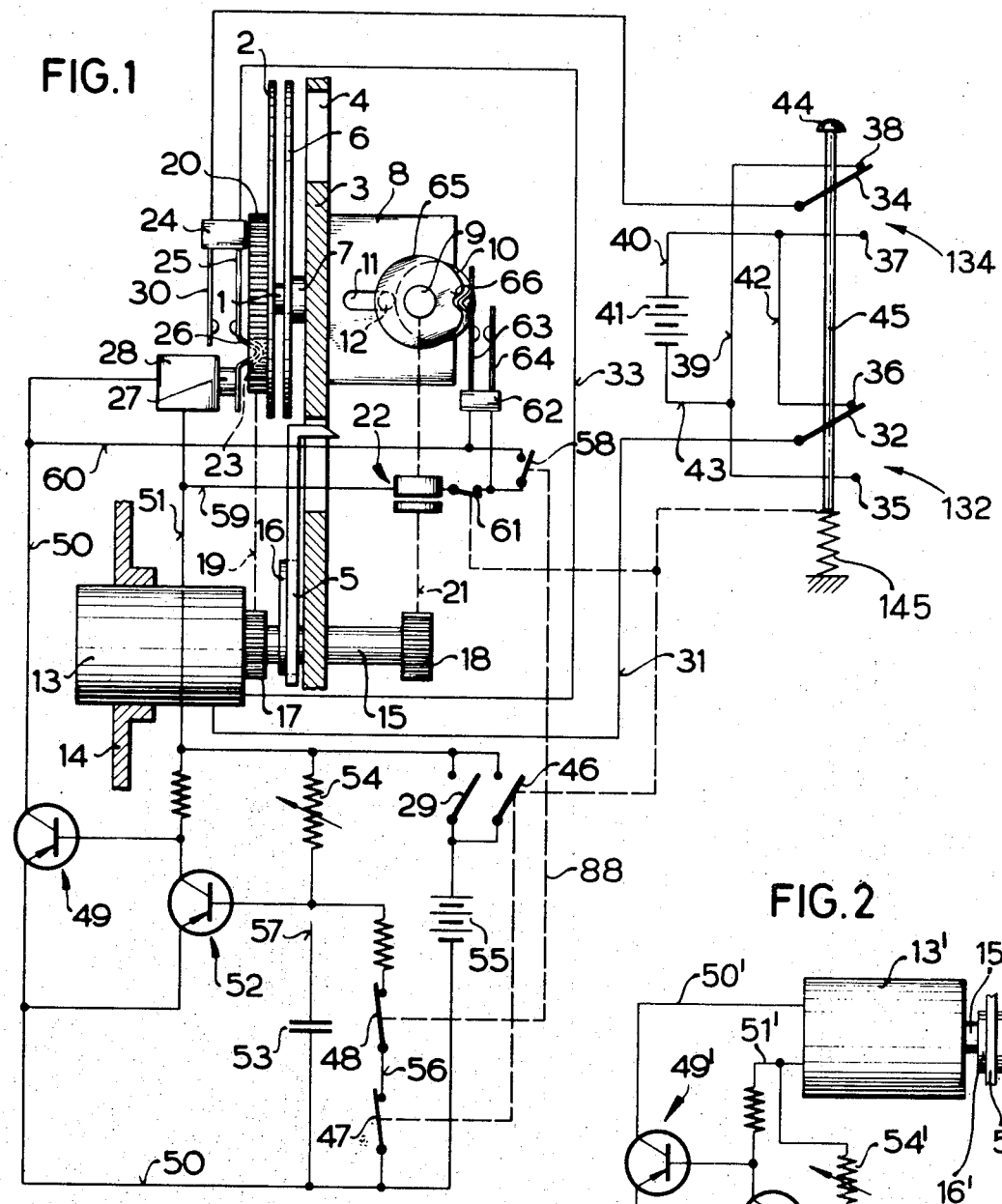

3,718,387
MOTION PICTURE CAMERA WITH DISSOLVING SHUTTER
Albert Stieringer, Weil der Stadt, Germany, assignor to Robert Bosch Photokino GmbH, Stuttgart-Unterturkheim, Germany
Filed July 26, 1971, Ser. No. 164,873
Claims priority, application Germany, Aug. 1, 1970, P 20 38 337.3
Int. Cl. G03b 21/36
U.S. Cl. 352—91                         10 Claims

ABSTRACT OF THE DISCLOSURE

A motion picture camera with dissolving shutter wherein the motor of the drive for film transport is automatically arrested by a compact electronic switching device which arrests the motor with a predetermined delay following the start of making exposures with fade-out effect and which also arrests the motor with the same delay upon completed rewinding of film frames which were exposed with fade-out effect so that such frames can be exposed again but with fade-in effect. The switching device is controlled by a compact electronic timer which is adjustable and is started in response to the start of making exposures with fade-out effect and in response to starting of the motor for the purpose of transporting the once-exposed film frames rearwardly. The switching device is a transistor which is connected directly into the motor circuit or controls an electromagnet which in turn controls an interrupter switch in the motor circuit.

BACKGROUND OF THE INVENTION

The present invention relates to motion picture cameras, in general, and more particularly to improvements in motion picture cameras which are provided with dissolving shutters for the making of exposures with fade-out and fade-in effect. Still more particularly, the invention relates to improvements in motion picture cameras which employ dissolving shutters and wherein the drive means for transporting the motion picture film forwardly and rearwardly comprises an electric prime move.

It is already known to provide a motion picture camera with a mechanical timer which arrests the drive for the transport of film upon compeltion of a predetermined number of exposures with fade-out effect and which also arrests the motor upon completion of rearward transport of those film frames which were already exposed with fade-out effect so that such film frames can be exposed for the second time but with fade-in effect. As a rule, a mechanical timer employs one or more disk-shaped members which are rotated by the motor of the drive for film transport. Such disk-shaped members rotate during forward transport of that length of film which is being exposed with fade-out effect and serve to open a switch in the circuit of the motor upon completion of a certain number of exposures with fade-out effect. Analogously, such disk or disks will open a switch in the circuit of the motor upon completion of rearward transport of those film frames which were exposed with fade-out effect so that the same frames can be exposed again with fade-in effect, i.e., the last images of a preceding sequence of images will be merged into the first images of the next-following sequence of images.

A drawback of mechanical timers is that their parts occupy a substantial amount of space which is at a premium in many types of portable motion picture cameras. Also, the parts of such timers must be machined with a high degree of precision in order to insure that all such film frames which were exposed with fade-out effect will be transported rearwardly toward the supply reel to be reexposed but with fade-in effect. Such precision-finished parts contribute considerably to the initial cost of motion picture cameras with dissolving shutters and, moreover, their incorporation into the housing of a relatively small motion picture camera presents many probelms, particularly as regards the accessibility of the components of the timer as well as the accessibility of other camera parts. Still further, since the rotary parts of a mechanical timer derive motion from the motor of the drive for the film transport, the camera must be provided with one or more clutches and power trains which can transmit motion to the rotary parts of the timer when necessary, namely, during the making of exposures with fade-out effect and during the rewinding of film prior to making of exposures with fade-in effect. Such power trains and clutches restrict the number of possible positions of the timer with reference to the motor, and vice versa, especially if the clutches are to be of the type which can be used in an average motion picture camera without excessively raising the initial cost. A motion picture camera with a mechanical timer for the motor of the drive for film transport is disclosed, for example, in U.S. Pat. No. 3,494,691.

SUMMARY OF THE INVENTION

An object of the invention is to provide in a motion picture camera with dissolving shutter a novel and improved timer and a novel and improved switching device or control device which is controlled by the timer and in turn controls the drive for the film transport in order to insure that the forward transport of film during the making of exposures with fade-out effect is terminated upon completion of a desired number of exposures with such effect and that the rearward transport of film prior to making of exposures with fade-in effect is invariably terminated when all of the film frames which were previously exposed with fade-out effect are ready for renewed exposure but with fade-in effect.

Another object of the invention is to provide in a motion picture camera with dissolving shutter novel and improved timer and control devices which together occupy much less room than the presently known timers and which can be readily accommodated in those portions of the internal space in the housing of a motion picture camera which remain available upon assembly of other camera components.

A further object of the invention is to provide in a motion picture camera with dissolving shutter novel and improved means for automatically terminating the operation of an electric motor which forms part of the drive for film transport.

An additional object of the invention is to provide in a motion picture camera with dissolving shutter novel and improved timer and control devices for the electric prime mover of the drive for film transport which together occupy only a small fraction of the space that is required for the corresponding parts of presently known motion picture cameras which are designed for the making of exposures with fade-out and fade-in effect.

The invention is embodied in a motion picture camera which comprises drive means including an electric prime mover (either a reversible electric motor or an electric motor whose output member can rotate in a single direction) and being actuatable to transport motion picture film forwardly and rearwardly, an adjustable dissolving shutter which is operable to produce exposures with fade-out and fade-in effect, electronic switching means (which may include a single transistor) normally assuming that one of a plurality of conditions in which the switching means permits the operation of the prime mover (for example, a transistor in such one condition will not block the flow of electric current to the prime mover or will not permit opening of an interrupter switch in the circuit of the prime mover) and hence the operation of the drive means for film transport, electronic timer means which is preferably adjustable and is actuatable to effect a change from the one condition of the switching means with a predetermined delay following the actuation of the timer means to thus prevent further operation of the prime mover with such delay, and one or more switches or analogous actuating means for actuating the timer means simultaneously with the start of adjustment with the shutter for the making of exposures with fade-out effect and also simultaneously with the actuation of the drive means to transport the film rearwardly.

The electronic timer means may include a capacitor in series with a variable resistor and a second transistor whose base is connected with a junction between the capacitor and variable resistor and whose emitter-collector circuit includes the base of the first-mentioned transistor. The space requirements of the two transistors, of the variable resistor and of the capacitor are but a very minute fraction of space requirements of presently known timers and control means for the motors of drives for film transport.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic diagram of certain parts in a motion picture camera with dissolving shutter wherein the timer means and the switching means or control means for the electric prime mover of the drive for film transport are constructed and assembled in accordance with a first embodiment of the invention; and FIG. 2 is a schematic diagram of switching means and timer means which constitute a modification of the switching means and timer means shown in FIG. 1.

DESCRIPTION OF THE PREFERRED EMBODIMENTS

Referring first to FIG. 1, there is shown a portion of a motion picture camera which is provided with an automatic dissolving shutter to permit the making of effect shots known as fade-out and fade-in. The dissolving shutter comprises a shaft 1 which carries a first shutter blade 2 having a cutout (not specifically shown) to admit scene light to a window or opening 4 providing in a wall 3 of the camera body or housing. The window 4 is located behind the picture taking lens (not shown) and in front of that film frame (not shown) which is to be exposed to scene light. The film is transported stepwise by a feeding device of the type known as claw pull-down and shown at 5. The arrangement is such that the claw of the pull-down 5 transports the film by the length of a frame when the opaque portion of the rotating shutter blade 2 overlies the window 4 and that the opening of the shutter blade 2 admits scene light to the window 4 when the transport of the film by the length of a frame is completed, i.e., when the window 4 is located in front of an unexposed stationary film frame.

The automatic dissolving shutter further comprises an adjustable second blade 6 which is located behind the blade 2 and in front of the wall 3 and has an opening (not specifically shown) which normally registers with the opening of the front blade 2 so that the opening of the rear blade 6 cannot influence the rate at which the scene light is being admitted to unexposed film frames behind the window 4. Thus, in normal operation of the motion picture camera, the rear blade 6 of the dissolving shutter exerts no influence on the exposures. This rear shutter blade 6 is fixed to a hollow tubular shaft 7 which surrounds the shaft 1 and extends into a housing or casing 8. The angular position of the blade 6 with reference to the blade 2 can be changed by rotating the shaft 7 with reference to the shaft 1 to move the opening of the blade 6 gradually out of registry with the opening of the blade 2 during the making of exposures with fade-out effect and to gradually return the opening of the blade 6 into full registry with the opening of the blade 2 during the making of exposures with fade-in effect. The camera is further provided with means for transporting the film rearwardly subsequent to the making of exposures with fade-out effect and prior to the making of exposures with fade-in effect so that all frames which were exposed with fade-out effect can be exposed again but with fade-in effect.

In normal operation of the camera, the shaft 7 is rotated with and at the exact speed of the shaft 1 to insure that the relative positions of blades 2 and 6 remain unchanged, i.e., that the blade 6 cannot influence the admission of scene light to unexposed film frames. The housing 8 accommodates at least the majority of components of a transmission which serves to change the angular position of the shaft 7 with reference to the shaft 1 during fade-out and again during fade-in. All details of such transmission form no part of the present invention. It suffices to say that the transmission comprises a shaft 9 which carries an eccentric disk 10 serving to shift a pin-shaped follower 12 along a slot 11 whereby the opening of the blade 6 moves out of registry with the opening of the blade 2 when the follower 12 is caused to move toward the left-hand end of the slot 11 and the opening of the blade 6 gradually returns into full registry with the opening of the blade 2 when the eccentric disk 10 permits or causes the follower 12 to return to the right-hand end position of FIG. 1. The inner end portion of the follower 12 can cause a pin or the like to travel in a helical groove of the shaft 7 to thereby cause the latter to change its angular position with reference to the shaft 1. The arrangement is such that an angular displacement of the eccentric disk 10 from the illustrated position causes the follower 12 to move the opening of the blade 6 completely out of registry with the opening of the blade 2 to thus terminate the making of exposures with fade-out effect by completely interrupting the beam of scene light which passes through the picture taking objective and tends to penetrate through the window 4 to expose the foremost unexposed film frame behind the wall 3. The making of exposures with fade-out effect is terminated in response to completed rotation of the disk 10 through 180 degrees.

The drive means for the claw pull-down 5 and for the shafts 1, 7 and 9 comprises a reversible-polarity electric motor 13 which is supplied with electrical energy by one or more batteries 41. The housing of the motor 13 is mounted in a wall 14 which is installed in or forms part of the camera body. The output shaft 15 of the motor 13 carries a plate cam 16 which actuates the pull-down 5, a first gear 17 which can drive a gear 20 on the shaft 1 of the dissolving shutter by way of a power train 19 (e.g., a train of gears), and a second gear 18 which can rotate the shaft 9 of the transmission for the shaft 7 by way of a second power train 21 including an electromagnetic clutch 22 which is normally denergized so that the motor 13 can drive the shaft 1 and the pull-down 5 while the shaft 9 remains idle. As mentioned above, the shaft 7 normally shares all angular movements of the shaft 1 so that the blades 2, 6 of the shutter rotate as a unit when the camera is operated in the customary way, namely, without fade-in or fade-out effect. The details of the power trains 19 and 21 (save for the provision of the electromagnetic clutch 22 in the power train 21) form no part of the present invention; therefore, such power trains are merely indicated by broken lines.

The gear 20 can be secured to the shaft 1 and/or to the shutter blade 2. This gear has a front end face (facing away from the blade 2) which is provided with a recess or socket 23 for a projection 26 on the elastically deformable contact 25 of a normally open electric interrupter switch 24 having a second contact 30 which is engaged by the contact 25 when the switch 24 is closed. The switch 24 can open only in a predetermined angular position of the blade 2 and gear 20, namely, when the socket 23 in the front face of the gear 20 is aligned with the projection 26. This takes place only when the blade 2 completely overlies the window 4 so that the shutter cannot admit scene light to motion picture film irrespective of the angular position of the shaft 7 and blade 6 with reference to the shaft 1 and blade 2. The elasticity of the contact 25 is such that it normally tends to move away from the contact 30 and to open the interrupter switch 24; therefore, the projection 26 bears against the front end face of the gear 20 which latter thus maintains the interrupter switch 24 in closed position as long as the socket 23 is angularly spaced from the projection 26.

The means for expelling or withdrawing the projection 26 of the movable contact 25 from the socket 23 to thus close the interrupter switch 24 comprises an electromagnet 28 which is normally deenergized and has an armature 27. The latter is connected with the movable contact 25 and moves this contact into engagement with the contact 30 to close the interrupter switch 24 in response to energization of the winding of the electromagnet 28. The armature 27 is reciprocable in parallelism with the optical axis of the picture taking lens of the camera.

The winding of the electromagnet 28 is in series with a master switch 29 which constitutes the release element of the camera and is normally open. When the user of the camera wishes to make one or more exposures, the master switch or release element 29 must be closed by hand or by remote control to energize the winding of the electromagnet 28 and to thus withdraw the projection 26 from the socket 23 of the gear 20 with attendant closing of the interrupter switch 24. The latter then completes the circuit of the motor 13 which rotates the output shaft 15 in a direction to transport the film forwardly by way of the cam 16 and pull-down 5 and to rotate the shutter blades 2, 6 by way of the gear 17, power train 19, gear 20 and shafts 1, 7. The operation of the power train 19 is synchronized with the operation of the cam 16 in the aforedescribed manner, namely, that the film is transported when the blade 2 prevents scene light from reaching the window 4 and that the window 4 receives scene light when the film is at a standstill and an unexposed film frame registers with the window 4 and hence with the picture taking lens. The thickness of the gear 20 on the shaft 1 is such that the interrupter switch 24 remains closed even if the master switch 29 is permitted to open and to thereby deenergize the winding of the electromagnet 28. Thus, even though the armature 27 would permit the projection 26 to penetrate into the socket 23 due to innate elasticity of the contact 25, the interrupter switch 24 remains closed while the gear 20 contitnues to rotate to a single predetermined position in which the blade 2 fully overlaps the window 4. This insures that the motor 13 can be arrested only when the blade 2 prevents scene light from reaching a film frame behind the window 4.

The motor 13 is connected with a pair of movable contacts 32, 34 by way of conductors 31 and 33. The interrupter switch 24 is mounted in the conductor 33. The contact 32 constitutes one component of a first two-way switch 132 and is movable between two fixed contacts 35, 36. The contact 34 forms part of a second two-way switch 134 which further includes two fixed contacts 37, 38. The switches 132, 134 form part of a pole reversing device for the motor 13, i.e., of a means for changing the direction of rotation of the output shaft 15. The movable contacts 32, 34 are coupled to each other by a rod-like shifting member 45 having a handgrip portion or knob 44 and being biased to the illustrated end position by a spring 145. In the illustrated position of the shifting rod 45 (in which the movable contacts 32, 34 respectively engage the fixed contacts 36, 38), the motor 13 is set to drive the shaft 15 in a direction to move the film forwardly by way of the cam 16 and pull-down 5. The fixed contacts 35, 38 are connected with each other by a conductor 39. The contact 37 is connected with one pole of the battery 41 by a further conductor 40 and the other pole of the battery 41 is connected with the conductor 39 by way of another conductor 43. A conductor 42 connects the conductor 40 with the contact 36. All that is necessary to transport the motion picture film in a forward direction and to make exposures without fade-in or fade-out effect is to permit the spring 145 to maintain the shifting rod 45 in the illustrated axial position and to close the master switch 29. If the direction of rotation of the output shaft 15 is to be reversed (particularly for rearward transport of those film frames which were already exposed with fade-out effect), the operator depresses the knob 44 to move the shifting rod 45 downwardly, as viewed in FIG. 1 (against the opposition of the spring 145), so that the movable contacts 32, 34 of the two-way switches 132, 134 respectively engage the fixed contacts 35 and 37. The shaft 15 begins to rotate in the opposite direction in response to energization of the winding of the electromagnet 28. The pull-down 5 then transports the film rearwardly, namely, in a direction from the takeup reel (not shown) toward the supply reel (not shown). The supply reel or both reels may but need not be installed in a cassette.

The winding of the electromagnet 28 is energized in automatic response to depression of the knob 44 because the shifting rod 45 then closes a normally open auxiliary switch 46 which is connected in parallel with the master switch 29. Thus, the closing of the master switch 29 is not a prerequisite for rotation of the motor 13 in a direction to transport the film rearwardly. This constitutes an advantageous feature of the invention because the operator is required to actuate a single element, namely, to depress the knob 44 when the motor 13 is to be operated in reverse, and to close the master switch 29 when the motor 13 is to be operated in a forward direction. However, it is equally within the purview of the invention to omit the auxiliary switch 46 and to mount the rod 45 in such a way that it can directly or indirectly close the master switch 29 in response to depression of the knob 44.

The camera further comprises an electronic timer which measures the length of the interval during which the exposures are made with fade-out effect and which further insures that the rearward transport of motion picture film is terminated when the frames which were exposed with fade-out effect are moved back to a position upstream of the window 4. The timer controls an electronic switching device or control device which automatically terminates the exposures with fade-out effect upon completed exposure of a preselected number of film frames and which also automatically terminates the rearward transport of film upon completed rearward transport of once-exposed film frames. The switching device is a transistor 49 which can effect the opening of the circuit of the motor 13 with a predetermined delay following the opening of one of two normally closed timer actuating switches 47, 48. The timer includes a variable resistor 54 in series with a capacitor 53 which is connected in parallel with a conductor 56 containing the actuating switches 47, 48. When the charge of the capacitor 53 reaches a threshold value in response to and with a delay following the opening of one of the switches 47, 48, the condition of the transistor 49 changes to thereby cause an opening of the circuit of the motor 13, first during forward transport of the film while the camera is making exposures with fade-out effect and thereupon during rearward transport of film while the dissolving shutter is closed.

A conductor 50 in the collector-emitter circuit of the switching transistor 49 is connected with one terminal of the winding of the electromagnet 28 and with one pole of a battery 55. The base of the transistor 49 is connected with a conductor 51 which is connected with the other terminal of the winding of the electromagnet 28. The conductor 51 branches from the conductor 50 and is connected in the collector-emitter circuit of a second transistor 52 forming part of the electronic timer. The aforementioned capacitor 53 of the timer is connected with the base of the transistor 52 by a conductor 57 which is further connected with the variable resistor 54. The actuating switches 47, 48 are connected in series in the aforementioned conductor 56 which is also connected with the base of the transistor 52. The actuating switch 48 can be opened by the knob 44 in response to shifting of the rod 45 against the opposition of the spring 145. The actuating switch 47 is mechanically connected with a further switch 58 in such a way that the switch 47 opens in response to closing of the normally open switch 58. The fixed contact of the switch 58 is connected with the conductor 50 by means of a conductor 60 which is further connected with the contact 63 of a switch 62. The movable contact of the switch 58 is connected with the conductor 51 by way of a conductor 59 which contains a normally closed switch 61 and is further connected with the contact 64 of the switch 62. The energizable element of the electromagnetic clutch 22 is connected in the conductor 59. The electromagnetic clutch 22 is engaged in response to closing of the switch 58 in closed position of the switch 61 or 62. The switch 61 opens in response to depression of the knob 44, i.e., in response to closing of the switch 46 and in response to opening of the actuating switch 47. When the shifting rod 45 dwells in the illustrated position (in which the motor 13 is ready to transport the film forwardly), the switch 61 is held in the closed position. The contacts 63, 64 of the switch 62 are elastic and the contact 63 bears against the periphery of a disk-shaped trip 65 on the shaft 9. A recess or cutout 66 in the trip 65 enables the switch 62 to open due to elasticity of the contact 63 when the trip 65 assumes the illustrated angular position.

The operation:

In order to start the camera and to make one or more exposures in the customary way (i.e., without fade-out or fade-in effect), the user closes the master switch 29 to complete the circuit of the motor 13. The closing of master switch 29 results in energization of the winding in the electromagnet 28 which thereupon attracts its armature 27 to withdraw the projection 26 of the contact 25 from the socket 23 of the gear 20. This causes the interrupter switch 24 to close and to complete the circuit of the motor 13. The master switch 29 completes the circuit of the winding of the electromagnet 28 by way of conductors 50, 51 and the switching transistor 49 so that the electromagnet 28 is in circuit with the battery 55. The circuit of the motor 13 is then completed from one pole of the energy source 41, by way of the conductors 40, 42, contacts 36, 32 of the two-way switch 132, conductor 31, motor 13, conductor 33, closed interrupter switch 24, contacts 34, 38 of the two-way switch 134, conductors 39, 43 and to the other pole of the energy source 41. The motor 13 drives its output shaft 15 in a forward direction and the gear 17 on the output shaft 15 drives the gear 20 by way of the power train 19. The gear 20 rotates the shafts 1, 7 and the shutter blades 2, 6 as a unit while the opening of the blade 6 registers with the opening of the blade 2 so that the blade 6 has no influence on the amount of scene light which can reach the film frames behind the window 4.

If the user wishes to terminate the normal operation, the master switch 29 is allowed or caused to open and to thus open the circuit of the motor 13 in the following way: The winding of the electromagnet 28 is deenergized and the armature 27 permits the movable contact 25 of the interrupter switch 24 to move away from the contact 30. However, the contact 25 is free to perform such movement only in that angular position of the gear 20 when the shutter blade 2 fully overlaps the window 4 to thus prevent scene light from reaching the film behind the wall 3. The elastically deformable contact 25 slides with its projection 26 along the front face of the gear 20 while the socket 23 moves toward registry with the projection 26 so that, as a rule, the interrupter switch 24 remains closed and completes the circuit of the motor 13 even if the master switch 29 is permitted or caused to open, excepting in the rather unlikely event that the master switch 29 opens at the exact moment when the socket 23 registers with and can receive the projection 26. The gear 20 thus insures that the forward transport of motion picture film can be terminated and the shutter can be arrested only when the blade 2 fully overlies the window 4. The socket 23 and the projection 26 of the contact 25 in the interrupter switch 24 constitute an advantageous safety feature which prevents undesirable penetration of scene light into the space for motion picture film when the motor 13 is idle.

If the user wishes to make exposures with fade-out effect and to thereupon reexpose the once-exposed film frames with made-in effect, i.e., to blend the last part of a preceding scene into the first part of the next-following scene, the camera is operated as follows:

The timer actuating switch 48 is opened by hand to interrupt the flow of current in the conductor 56 and to start the charging of capacitor 53 at the rate determined by the setting of the variable resistor 54 of the timer. The opening of the actuating switch 48 (by hand or by remote control) automatically results in closing of the switch 58 because the two switches are mechanically connected to each other as shown by the broken line 88. The switch 61 is assumed to be held in closed position because the motor 13 is assumed to rotate the output shaft 15 in a forward direction (the master switch 29 is closed) and, since the switch 58 is closed in response to opening of the actuating switch 48 which initiates the charging of the capacitor 53, the circuit of the electromagnetic clutch 22 is completed by way of switches 58, 61 and conductors 59, 60. Therefore, the gear 18 on the output shaft 15 of the motor 13 drives the shaft 9 through the intermediary of the energized clutch 22 to rotate the eccentric disk 10 and the trip 65. The trip 65 immediately closes the switch 62 by causing the elastic contact 63 to engage the other contact 64, and the eccentric disk 10 begins to move the follower 12 in a direction to the left to thereby turn the shaft 7 and the blade 6 with reference to the shaft 1 and blade 2 with the result that the blade 6 gradually reduces the effective size of the opening in the blade 2. This causes the camera to make exposures with fade-out effect. The shutter ceases to admit any light when the shaft 9 completes one-half of a revolution.

The charging of capacitor 53 progresses while the motor 13 drives the disk 10 and trip 65 from the illustrated positions. When the disk 10 causes the follower 12 to completely close the shutter (i.e., to terminate the making of exposures with fade-out effect), the capacitor 53 is charged to such an extent that the normally blocking transistor 52 of the electronic timer begins to conduct and causes the switching transistor 49 to block. The switching transistor 49 thus interrupts the flow of current in the conductor 50 to abruptly deenergize the winding of the electromagnet 28. The armature 27 permits the contact 25 of the switch 24 to move away from the contact 30 to thus open the interrupter switch 24 and to arrest the motor 13 as soon as the socket 23 of the gear 20 moves into registry with the projection 26 of the contact 25.

When the switching transistor 49 begins to block in response to a change in the condition of the transistor 52 upon completion of the charging of capacitor 53 by way of the variable resistor 54 (which is preadjusted at the factory and determines the number of frames to be exposed with fade-out effect), the electromagnetic clutch 22 is automatically deenergized because the flow of electric current in the conductor 50 is interrupted. Thus, the shaft 9 ceases to rotate in an angular position in which the disk 10 maintains the follower 12 in the left-hand end portion of the slot 11 and the trip 65 maintains the switch 62 in closed position.

The operator releases the actuating switch 48 as soon as he or she notes that the motor 13 is arrested. The actuating switch 48 automatically returns to the illustrated closed position and causes the switch 58 to open so that the clutch 22 cannot be energized even if the switching transistor 49 begins to conduct. The capacitor 53 discharges in response to closing of the actuating switch 48.

The user thereupon depressed the knob 44 to set the motor 13 for operation in reverse so that the pull-down 5 can transport rearwardly those film frames which were exposed with fade-out effect. As the user depresses the knob 44, the shifting rod 45 moves the contacts 32, 34 of the two-way switches 132, 134 into engagement with the fixed contacts 35, 37, and the rod 45 also closes the auxiliary switch 46 and opens the actuating switch 47. Still further, the rod 45 opens the switch 61. The transistor 52 of the electronic timer blocks because the capacitor 53 was permitted to discharge on closing of the actuating switch 48 and the switching transistor 49 conducts so that the closing of auxiliary switch 46 by way of the rod 45 results in energization of the winding of the electromagnet 28. The armature 27 withdraws the projection 26 of the contact 25 from the socket 23 of the gear 20 so that the interrupter switch 24 closes and completes the circuit of the motor 13. The latter can rotate the output shaft 15 in a direction to transport the film rearwardly. The circuit of the motor 13 is completed from one pole of the energy source 41, by way of the conductor 43, contacts 35, 32 of the two-way switch 132, conductor 31, motor 13, conductor 33, closed interrupter switch 24, contacts 34, 37 of the two-way switch 134, conductor 40, and to the other pole of the energy source 41. The capacitor 53 is being charged in response to opening of the actuating switch 47 by the rod 45, and such charging progresses at the rate determined by the resistance of the variable resistor 54. The switch 61 is held in its open position by the rod 45 and the switch 58 is also open so that the clutch 22 is deenergized and cannot cause the power train 21 to drive the shaft 9. Therefore, the members 10, 65 dwell in positions angularly spaced through 180 degrees from the positions shown in FIG. 1, i.e., the dissolving shutter is completely closed to prevent entry of scene light during rearward transport of the film and the switch 62 is held in its closed position.

The capacitor 53 is sufficiently charged to cause the transistor 52 to conduct when the last film frame which was exposed with fade-out effect is returned to a position upstream of the window 4. The transistor 52 then causes the switching transistor 49 to block and to abruptly deenergize the winding of the electromagnet 28. The armature 27 permits the interrupter switch 24 to open and to arrest the motor 13 as soon as the socket 23 of the gear 20 moves into registry with the projection 26 on the contact 25. The operator then terminates the application of finger pressure against the knob 44 so that the spring 145 is free to return the shifting rod 45 to the position shown in FIG. 1. The rod 45 returns the contacts 32, 34 to the illustrated positions so that the motor 13 is ready to rotate the output shaft 15 in a forward direction. The rod 45 also closes the switches 47, 61 and opens the switch 46. The capacitor 53 is free to discharge in immediate response to closing of the actuating switch 47 by the rod 45 (spring 145) so that the transistor 52 is ready to block and the switching transistor 49 is ready to conduct.

The exposures with fade-in effect are made by closing the master switch 29 while the shifting rod 45 dwells in the illustrated position. The master switch 29 completes the circuit of the winding of the electromagnet 28 which is energized to retract the armature 27 and to close the interrupter switch 24. The motor 13 is started in a forward direction and the output shaft 15 rotates in a direction to advance the film forwardly (by way of the cam 16 and pull-down 5) and to rotate the shutter blades 2, 6 by way of the gear 17, power train 19 and gear 20. The circuit of the electromagnetic clutch 22 is completed because the switch 61 is held in closed position by the shifting rod 45 and the switch 62 is held in closed position by the trip 65 on the shaft 9. The output shaft 15 is free to rotate the shaft 9 by way of the gear 18 and power train 21 (including the energized clutch 22), whereby the shaft 9 rotates the disk 10 to gradually increase the effective size of the opening in the front shutter blade 2 from zero to the maximum value. The camera thus makes exposures with fade-in effect, and such exposures are made on frames which were previously exposed with fade-out effect. The rotating shaft 9 causes the trip 65 to move its recess 66 into registry with the projection of the contact 63 and to thus permit opening of the switch 62 to deenergize the clutch 22 and to terminate the rotation of shaft 9 when the parts 10 and 65 reassume the angular positions shown in FIG. 1. If the user of the camera continues to maintain the master switch 29 in closed position after the parts 10, 65 reassume the positions shown in FIG. 1, the camera begins to make exposures in the customary way, namely, without fade-in or fade-out effect. The amount of light which reaches the film frames behind the window 4 is then normally controlled as a function of the intensity of such light, for example, by resorting to a conventional light meter which can adjust a diaphragm, not shown, in dependency on changes in scene brightness.

The camera which includes the structure of FIG. 2 differs from the camera of FIG. 1 in that the switching transistor 49' (which replaces the transistor 49) is connected directly in the circuit of the motor 13'. The electronic timer 52', 53', 54' is identical with the timer 52–54 of FIG. 1. Since the use of a reversible-polarity motor in the camera which embodies the structure of FIG. 2 would present certain difficulties, the output shaft 15' of the motor 13' is preferably rotated in a single direction and the rearward transport of film is effected by mounting on the shaft 15' a modified drive means for the pull-down 5'. Such modified drive means preferably includes an angularly adjustable cam 16' which causes the pull-down 5' to transport the film forwardly in a first angular position of the cam 16' and while the shaft 15' rotates in a given direction, and which causes the pull-down 5' to transport the film rearwardly while the shaft 15' continues to rotate in the same direction, merely by changing the angular position of the cam 16'. Thus the motor 13' can be of much simpler construction than the motor 13 because it is merely required to drive the shaft 15' in a single direction. Therefore, the adjustable cam 16' (or an analogous reversing device) replaces the cam 16 in order to enable the operator to change the direction of film transport subsequent to completion of exposures with fade-out effect. A film feeding mechanism having an angularly adjustable cam for the pull-down is shown, for example, in U.S. Pat. No. 3,212,840.

An important advantage of the improved electronic timer and electronic switching means for the motor 13 or 13' is that they can be assembled and properly adjusted prior to mounting in the body or housing of a motion picture camera with dissolving shutter. Moreover, the components of the timer and switching means can be mounted in a very small space and need not be closely adjacent to each other so that they can fill small spaces which remain available upon completed assembly of other camera components. The mounting of the switching means 49 or 49' in a selected or available space in the interior of the camera body is not dependent on the place which was selected for the motor of the drive for film transport and/or for the electromagnet 28 since the length of the conductors 50, 51 (FIG. 1) or conductors 50', 51' (FIG. 2) can be selected at will without in any way affecting the dimensions and/or shape of the camera body. It was found that the improved switching means and the improved electronic timer can be used with equal advantage in spohisticated as well as in relatively simple and compact motion picture cameras.

The embodiment of FIG. 1 exhibits the advantage that the changes in direction of film transport can be effected in a very simple way, merely by changing the polarity of the motor 13. This is possible because the circuit of the switching transistor 49 is electrically separated from the circuit of the motor 13. The embodiment of FIG. 2 exhibits the advantage that it is simpler and less expensive because the switching transistor 49' is mounted directly in the circuit of the motor 13'.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a motion picture camera, a combination comprising drive means including an electric prime mover and being actuatable to transport the film forwardly and rearwardly; an adjustable dissolving shutter operable to produce exposures with fade-out effect; electronic switching means normally assuming that one of a plurality of conditions in which said switching means permits the operation of said prime mover and hence the actuation of said drive means; electronic timer means actuatable to effect a change from said one condition of said switching means with a predetermined delay following the actuation thereof to thus terminate the operation of said prime mover with said predetermined delay; and means for actuating said timer means simultaneously with the start of adjustment of said shutter for the making of exposures with fade-out effect and also simultaneously with the actuation of said drive means to transport the film rearwardly.

2. A combination as defined in claim 1, further comprising interrupter switch means in series with said prime mover and electromagnet means energizable by said switching means in said one condition thereof to thereby close said switch means.

3. A combination as defined in claim 1, wherein said switching means is connected in circuit directly with said prime mover.

4. A combination as defined in claim 1, wherein said switching means comprises a transistor.

5. A combination as defined in claim 4, wherein said transistor comprises an emitter-collector circuit and said prime mover is connected directly in said circuit.

6. A combination as defined in claim 4, wherein said transistor comprises an emitter-collector circuit and further comprising interrupter switch means in series with said prime mover, and means for closing said switch means in said one condition of said switching means, said means for closing said switch means being connected in said emitter-collector circuit of said transistor.

7. A combination as defined in claim 1, wherein said prime mover is a reversible electric motor.

8. A combination as defined in claim 1, wherein said shutter includes rotary blade means and further comprising means for rotating said blade means in response to actuation of said drive means.

9. A combination as defined in claim 1, wherein said electronic timer means includes a capacitor and a resistor in series with said capacitor.

10. A combination as defined in claim 1, wherein said timer means comprises a capacitor and said means for actuating said timer means comprises switch means connected in parallel with said capacitor and means for opening said switch means at the will of the operator of the camera to thereby start the charging of said capacitor, said capacitor being arranged to effect said change from said one condition of said switching means in response to accumulation of a predetermined charge.

References Cited
UNITED STATES PATENTS

| | | | |
|---|---|---|---|
| 3,597,061 | 10/1969 | Stieringer | 352—91 |
| 3,549,249 | 12/1970 | Katsuyama | 352—91 |
| 3,246,944 | 4/1966 | Winkler | 252—91 |
| 3,545,852 | 12/1970 | Winkler | 352—91 |
| 3,617,118 | 11/1971 | Muller | 352—91 |

SAMUEL S. MATTHEWS, Primary Examiner

R. E. ADAMS, Jr., Assistant Examiner

U.S. Cl. X.R.

352—217